United States Patent
Ohbuchi et al.

(10) Patent No.: US 8,878,980 B2
(45) Date of Patent: Nov. 4, 2014

(54) IMAGE SIGNAL PROCESSING DEVICE FOR AUTO-FOCUS FOR A SCENE INCLUDING A POINT LIGHT SOURCE

(75) Inventors: Mari Ohbuchi, Yokohama (JP); Hirotomo Sai, Yokohama (JP); Junji Shiokawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 13/570,460

(22) Filed: Aug. 9, 2012

(65) Prior Publication Data

US 2013/0107107 A1    May 2, 2013

(30) Foreign Application Priority Data

Oct. 31, 2011    (JP) .................................. 2011-238188

(51) Int. Cl.
    *H04N 5/232*    (2006.01)
    *G02B 7/38*    (2006.01)

(52) U.S. Cl.
    CPC .............. *G02B 7/38* (2013.01); *H04N 5/23212* (2013.01)
    USPC ........................................................ 348/349

(58) Field of Classification Search
    USPC ........................................................ 348/349
    See application file for complete search history.

(56) References Cited

U.S. PATENT DOCUMENTS

| | | | |
|---|---|---|---|
| 2004/0061800 A1* | 4/2004 | Yamazaki | 348/349 |
| 2005/0249488 A1* | 11/2005 | Takei | 396/101 |
| 2007/0086767 A1* | 4/2007 | Nakai | 396/101 |
| 2010/0123818 A1* | 5/2010 | Ono | 348/345 |
| 2010/0315514 A1* | 12/2010 | Uchida | 348/187 |
| 2011/0157425 A1* | 6/2011 | Nakayama | 348/234 |
| 2012/0162494 A1* | 6/2012 | Nakamura | 348/345 |

FOREIGN PATENT DOCUMENTS

JP    2010-286791    12/2010

* cited by examiner

*Primary Examiner* — Nicholas Giles
*Assistant Examiner* — Abdelaaziz Tissire
(74) *Attorney, Agent, or Firm* — Antonelli, Terry, Stout & Kraus, LLP.

(57) ABSTRACT

The autofocus function included in general digital cameras and video cameras cannot set the camera to an in-focus state for a scene including a point light source depending on cases. This difficulty is removed by an image signal processing device including an area setting unit to set an area as a target area to calculate a focus evaluation value, a detection unit to judge presence or absence of a point light source in the area set as a target area, and a calculation unit to identify, by use of information obtained from the detection unit, an area in which a point light source exists and to calculate a focus evaluation value by removing the identified area from the target area. Once the detection unit detects a point light source, it conducts the operation only after a predetermined period of time.

20 Claims, 16 Drawing Sheets

US 8,878,980 B2

IMAGE SIGNAL PROCESSING DEVICE FOR AUTO-FOCUS FOR A SCENE INCLUDING A POINT LIGHT SOURCE

INCORPORATION BY REFERENCE

The present application claims priority from Japanese application JP2011-238188 filed on Oct. 31, 2011, the content of which is hereby incorporated by reference into this application.

BACKGROUND OF THE INVENTION

The present invention relates to an image signal processing device. A technique of the background art in the field of image signal processing devices has been described in, for example, JP-A-2010-286791. According to JP-A-2010-286791, an object is that the in-focus point is correctly and easily judged to obtain the in-focus state also for a scene including a point light source. As a solution, there is disposed a CPU 70 as focus evaluation value calculating unit which sets, for an image, a plurality of focus evaluation value calculation areas mutually different in size from each other and which calculates, while moving a focus lens 52 by a lens driver 55, a focus evaluation value of contrast in the image for each focus evaluation value calculation area, an area selecting unit for selecting a focus judge area to judge an in-focus position of the focus lens 52 from the plural focus evaluation value calculation areas, based on presence or absence of a point light source in the image, and a focus control unit which judges an in-focus position of the focus lens 52 based on an in-focus evaluation value in the in-focus judge area and which moves the focus lens 52 to the in-focus position by the lens driver 55.

SUMMARY OF THE INVENTION

JP-A-2010-286791 describes a method to increase performance of the autofocus operation in the presence of a point light source. However, when the position and the size of saturated pixels are frequently changed moment by moment according to the position of the focus lens during the autofocus control operation, the in-focus judge area to be selected frequently changes. This possibly makes it impossible in some cases to stably obtain the in-focus evaluation value to correctly establish the in-focus state.

To solve the problem above, it is an object of the present invention to provide an image signal processing device to achieve an Auto Focus (AF) operation with high precision also for a scene including a point light source.

An outline of representative aspects of the present invention described in this specification is as follows.

(1) An image signal processing device including an imaging unit including a focus lens, a point light source detection unit for detecting a point light source in an area as a target area to calculate a focus evaluation value to be used to move the focus lens to an in-focus point, an evaluation value calculation unit for identifying an area in which the point light source detected by the point light source detection unit exists and calculating a focus evaluation value for an area obtained by removing the area identified by the evaluation value calculation unit from the area as a target area to calculate a focus evaluation value, and a system control unit for controlling the focus lens based on the focus evaluation value calculated by the evaluation value calculation unit and controlling an operation from when autofocus control is started to when the focus lens is set to an in-focus state, wherein the system control unit conducts a control operation to keep unchanged the area identified by the evaluation value calculation unit, from when autofocus control is started to when the focus lens is set to an in-focus state.

(2) An image signal processing device of (1) further including an area setting unit for dividing the area as a target area to calculate a focus evaluation value into a plurality of areas and setting the areas, wherein the evaluation value calculation unit sets the area in which a point light source exists, in units of areas obtained by the area setting unit.

(3) An image signal processing device of (2), wherein the evaluation value calculation unit calculates the focus evaluation value by adding a weight factor for each of the areas set by the area setting unit.

According to the present invention, there is provided an image signal processing device to achieve an AutoFocus (AF) operation with high precision also for a scene including a point light source.

Other objects, features and advantages of the invention will become apparent from the following description of the embodiments of the invention taken in conjunction with the accompanying drawings.

DESCRIPTION OF THE EMBODIMENT

Figure 1:
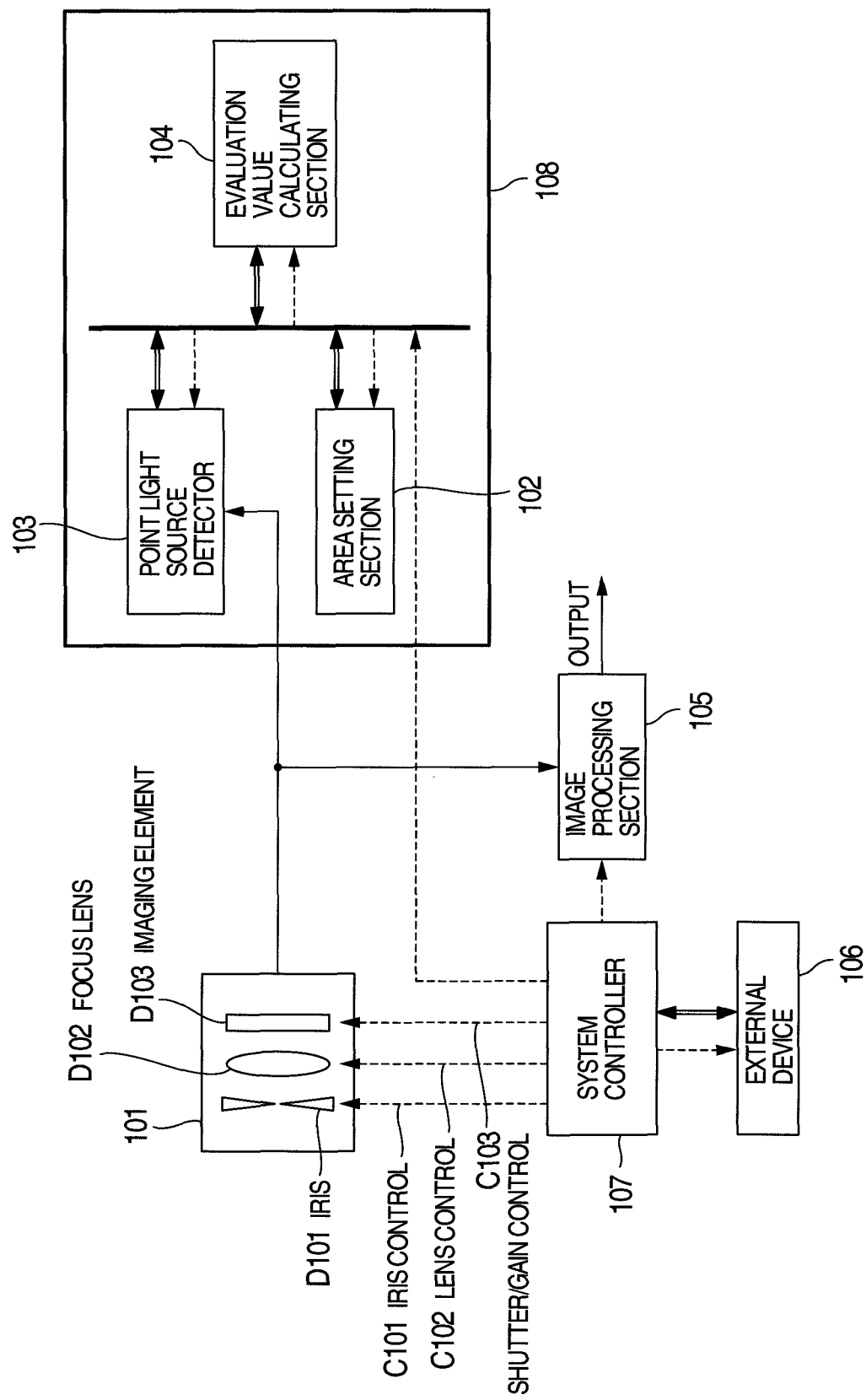
FIG. 1 is a diagram showing a first basic configuration example of an image signal processing device according to an embodiment.

Description will now be given of an embodiment of the present invention by referring to the drawings.

(1) Area Division Method

Description will be given of a unit which sets imaging areas as a target area to calculate focus evaluation values, in the form of a tiled wall including tiles of a desired number in each of the horizontal and vertical directions and which detects a point light source for each of the imaging areas to remove any area including a point light source from the target area to calculate focus evaluation values. This is referred to as an area division method in the embodiment.

Description will be given in detail of the area division method. FIG. 1 shows a first basic configuration example of an image signal processing device according to the present embodiment. In FIG. 1, a solid line indicates a signal, a broken line indicates control, and a double line indicates a control flow. This also applies to FIG. 14. An imaging section 101 includes, according to necessity, an iris D101 to adjust quantity of light of incidence from a subject, a focus lens D102 to adjust a focal point of light having passed the iris D101, and an imaging element D103 which conducts a photoelectric conversion for light having passed the focus lens D102 to thereby produce an image signal. For these constituent components, a system controller 107 conducts iris control C101, lens control C102, and shutter/gain control C103. An area setting section 102 sets, in response to an instruction from the system controller 107, an arbitrary number of areas for which focus evaluation values are to be calculated, with an arbitrary size and at an arbitrary position. A point light source detecting section 103 compares, in response to an instruction from the system controller 107, each image signal which is selected from the image signals obtained from the imaging section 101 and which is in the area set by the area setting section 102 with a threshold value and determines presence or absence of a point light source by assuming for each area that an image signal equal to or more than the threshold value is a point light source. In response to an instruction from the system controller 107, a focus evaluation value calculating section 104 calculates a focus evaluation value using image signals in the area obtained by removing the areas including a point light source, by use of the information regarding absence or presence of a point light source obtained by the point light source detecting section 103 for each area. The focus evaluation value is represented by, for example, a signal obtained by accumulating high-frequency components of the image signal for each line, to detect intensity of image signals in a contour part of a designated area. In response to an instruction from the system controller 107, an image processing section 105 conducts, according to necessity, image signal processing for the image signals obtained from the imaging section 101 such as removal of noise, gamma correction, contour emphasis, filtering, zooming, hand movement correction, and image recognition as well as output interface processing to convert the image signal into a signal of a signal format conforming to an output device, e.g., a TV set or a storage. The output interface processing is, for example, a conversion of image signals into video output signals conforming to National Television System Committee (NTSC) and/or the Phase Alternating by Line (PAL) system; for example, a conversion of image signals into High Definition Multimedia Interface (HDMI) signals as well as into predetermined signals for transmission thereof via a network. An external device 106 includes external devices, for example, an Electrically Erasable Programmable Read-Only Memory (EEPROM) to save various setting states, various sensors, and a flash memory and is controlled by the system controller 107. The system controller 107 controls the imaging section 101, the area setting section 102, the point light source detecting section 103, the focus evaluation value calculating section 104, the image processing section 105, and the external device 106. An autofocus section 108 indicates a group of functional blocks required for AF control, specifically, the area setting section 102, the point light source detecting section 103, and the focus evaluation value calculating section 104. Due to the configuration, it is possible that the point light source detecting section 103 identifies an area including a point light source and the focus evaluation value calculating section 104 calculates, by using results of the identifying operation, the focus evaluation value by removing each area including a point light source from the target area for the focus evaluation value calculation. Hence, the autofocus operation can be conducted with high precision also for a scene including a point light source.

Figure 2:
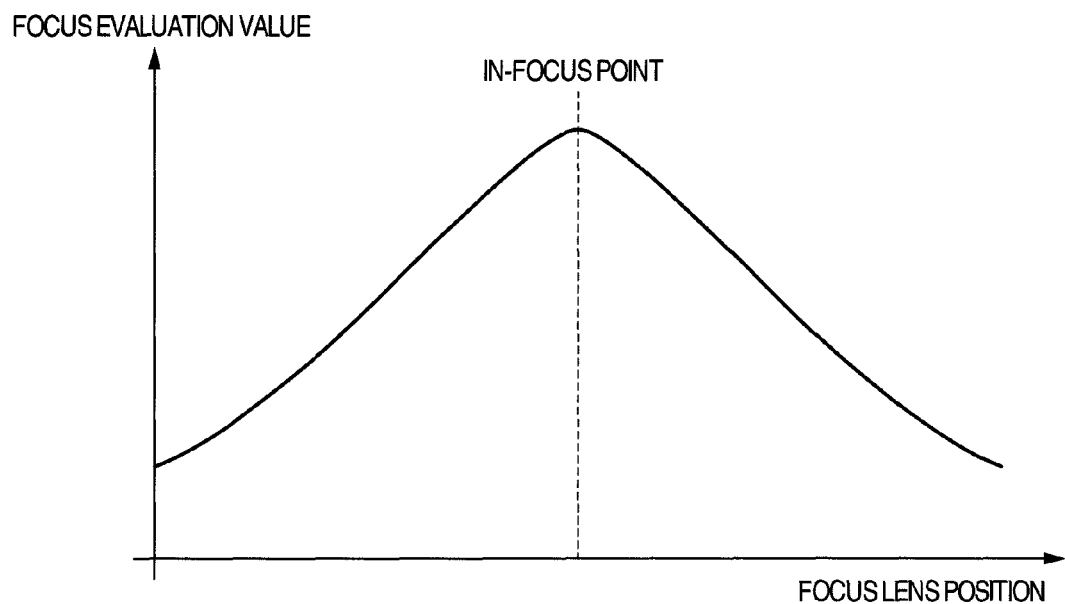
FIG. 2 is a graph showing an example of focus evaluation values to judge strength of contrast of a general subject not including a point light source.

FIG. 2 graphically shows an example of focus evaluation values to judge strength of contrast for a general subject not including a point light source. The abscissa represents the position of the focus lens and the ordinate represents the focus evaluation value. In the description blow, the position of a focus lens at which the subject is in focus will be referred to as an in-focus point. For a general subject, as the focus lens approaches the in-focus point, the contour part becomes stronger and the level of the focus evaluation value becomes higher. As the focus lens is apart from the in-focus point, the contour part becomes weaker and the focus evaluation level lowers. It is hence possible that the system detects the peak value of the focus evaluation value and controls the focus lens to move to the point associates with the peak value, to thereby set a state in which the subject is correctly in focus.

Figure 3:
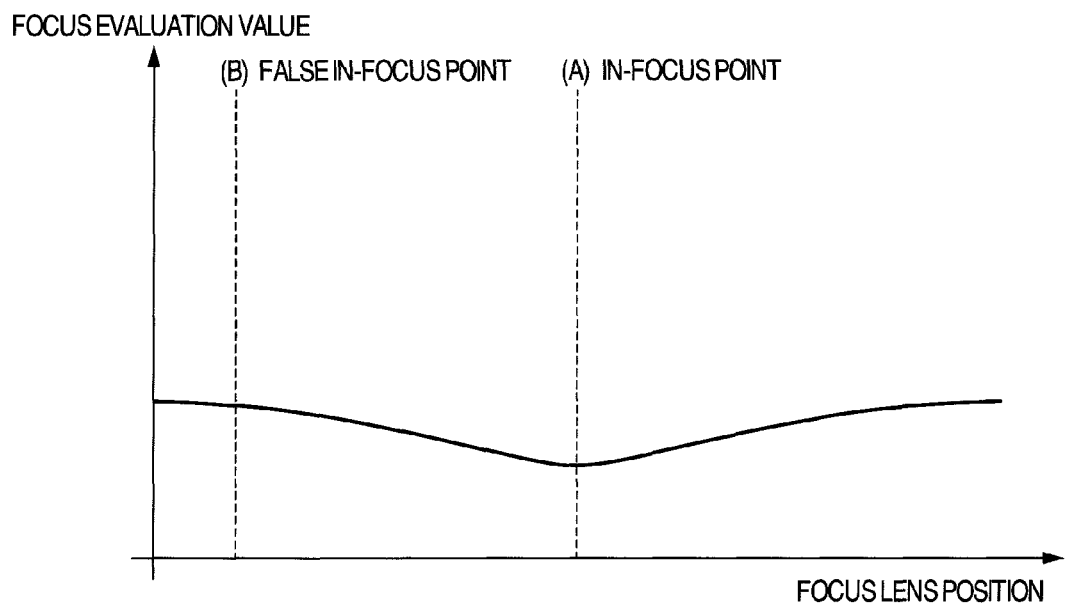
FIG. 3 is a graph to explain an example of focus evaluation values for a subject including a point light source.

FIG. 3 is a graph to explain an example of focus evaluation values for a subject including a point light source. At an in-focus point indicated by (A), the focus evaluation value is other than the peak value for the following reason. The more a point light source apart from the in-focus point is, the more out of focus the point light source is and the greater the obtained image thereof is. Hence, the more the point light source apart from the in-focus point is, the stronger the contour part is. As a result, the focus evaluation value is more than that obtained at the in-focus point. Hence, when AF control is conducted to move the focus lens to the position at which the focus evaluation value of the subject including a point light source takes the largest value, the focus lens is stopped by regarding the false in-focus point indicated by (B) as the actual in-focus point. The false in-focus point is a focus-lens position at which the focus lens is stopped under AF control although this point is not the actual in-focus point. When the focus lens is stopped at the false in-focus point, the subject is out of focus.

Figure 4:
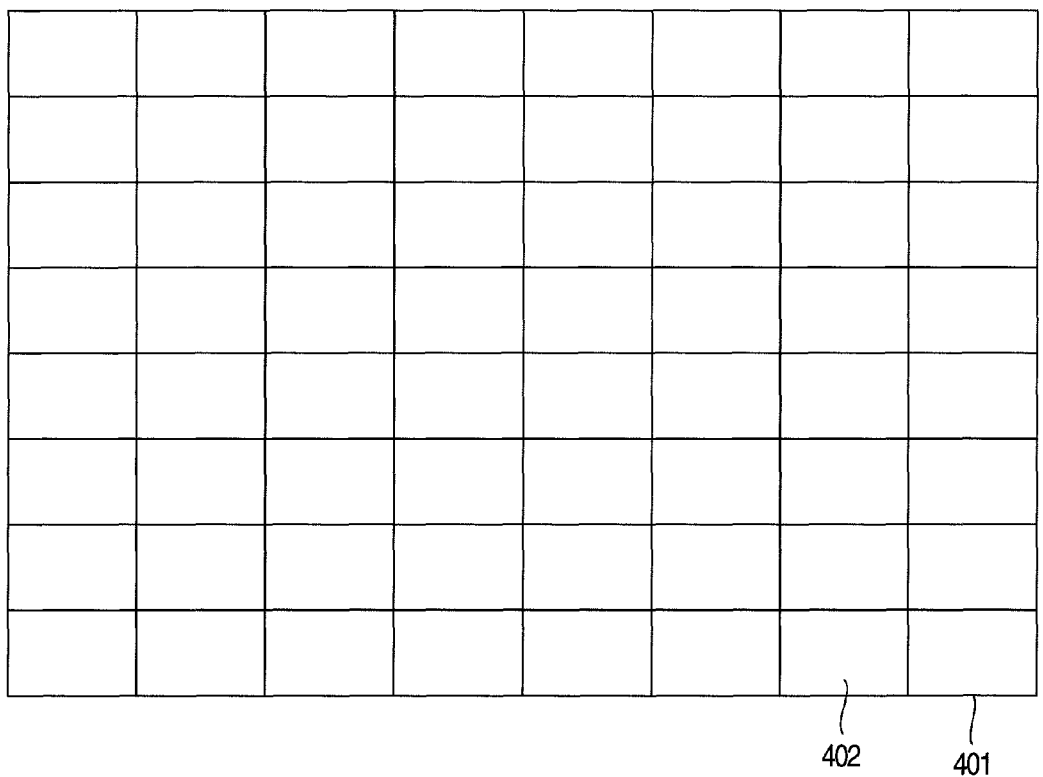
FIG. 4 is a diagram to explain an example of areas set in a screen.

FIG. 4 shows an example of areas set in an imaging screen to display an image of the subject. A frame 401 on the outermost side is arranged to define an area smaller than the imaging screen to prevent the rear-focus event in which the subject is out of focus, but the background of the subject is in focus. Areas 402 represent areas obtained by dividing the area defined by the frame 401. In the present embodiment, the area of the frame 401 is divided into eight partitions in the horizontal and vertical directions. However, the present invention is not restricted by the embodiment. Although each obtained area is in the form of a tile, the shape of the area may be changed to, for example, a square according to necessity. When the area setting section 102 is implemented by hardware, the hardware cost soars if the area of the frame 401 is divided into too many areas. However, the number of areas may be increased for higher performance. Or, the number of areas may be decreased to lower the processing cost.

Figure 5:
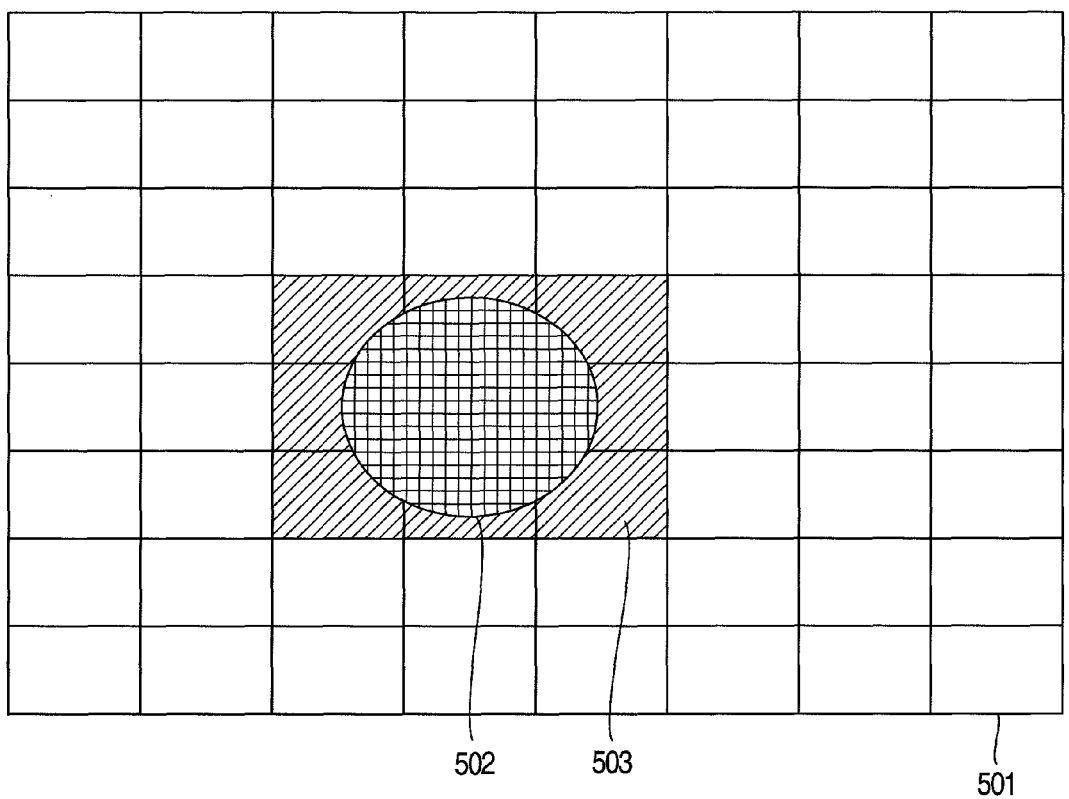
FIG. 5 is a diagram showing a first example of AF control coping with a point light source by identifying areas including a point light source.
Figure 6:
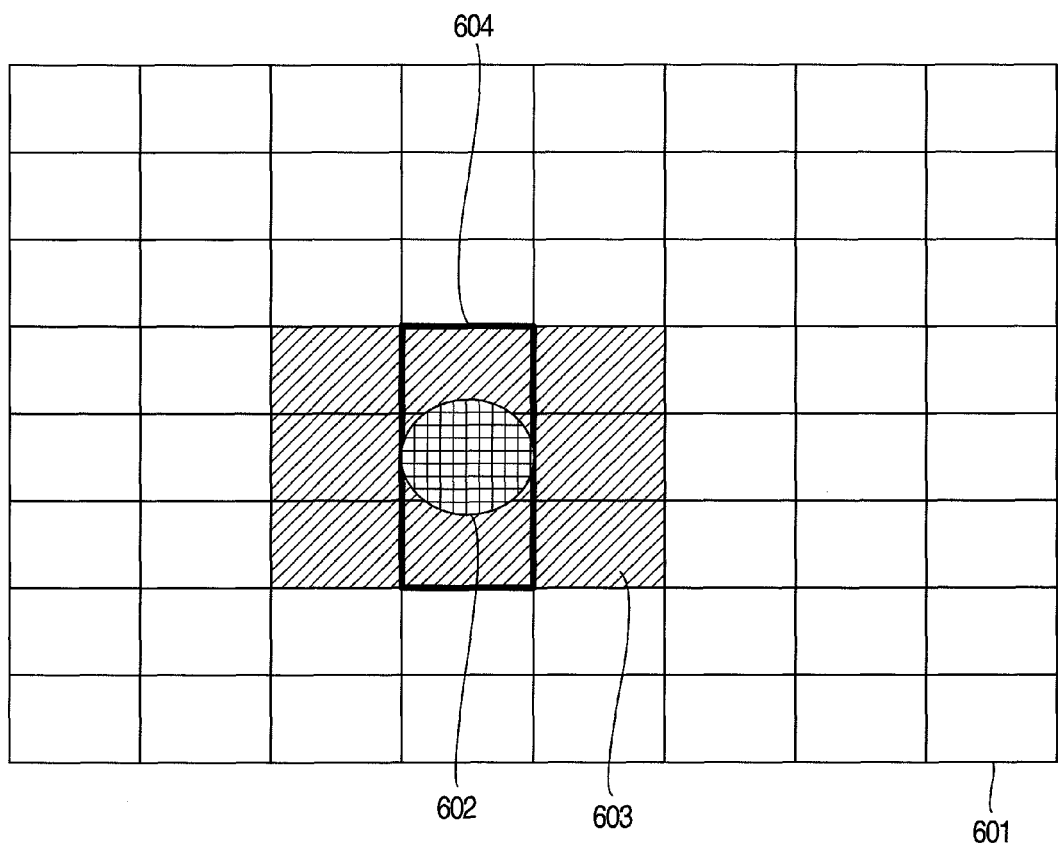
FIG. 6 is a diagram showing a second example of AF control coping with a point light source by identifying areas including a point light source.

FIGS. 5 and 6 are diagrams to explain examples of AF control coping with a point light source by identifying areas including a point light source. FIG. 5 shows a state immediately after the AF control operation is started. Numeral 501 indicates a frame substantially equal to the frame 401 of FIG. 4. Numeral 502 indicates a point light source existing in the frame 501. Since the focus lens is apart from the in-focus point, the point light source is out of focus and is enlarged in size. In this state, the area including the point light source is as indicated, for example, by 503. FIG. 6 shows a state in which the focus lens is moved to further approach the in-focus point through AF control as compared with FIG. 5. Numeral 601 indicates a frame substantially equal to the frame 501. Numeral 602 indicates a point light source existing in the frame 601. Since the focus lens is less apart from the in-focus point, the area of the point light source in the AF frame is smaller than that shown in FIG. 5. Hence, even in an area including a point light source in FIG. 5, no point light source exists in FIG. 6 depending on cases. While a point light source exists in the area 603 in the state of FIG. 5, a point light source exists only in an area 604 in the state of FIG. 6. However, when the area judged that the area includes a point light source is frequently changed in association with the point light source which expands or contracts according to the position of the focus lens, the number of areas to be used to calculate the focus evaluation value is changed. Hence, it is not possible to stably obtain the focus evaluation value with high precision in which the focus evaluation value monotonously increases toward an actual in-focus point as shown in FIG. 2. To overcome this difficulty, the area judged as an area including a point light source is kept unchanged from when control of the focus lens is started to when the focus lens stops at the in-focus point in the present embodiment. As a result, there can be obtained a stable focus evaluation value with high precision without any influence from the variation in the size of the point light source caused by the movement of the focus lens.

Figure 7:
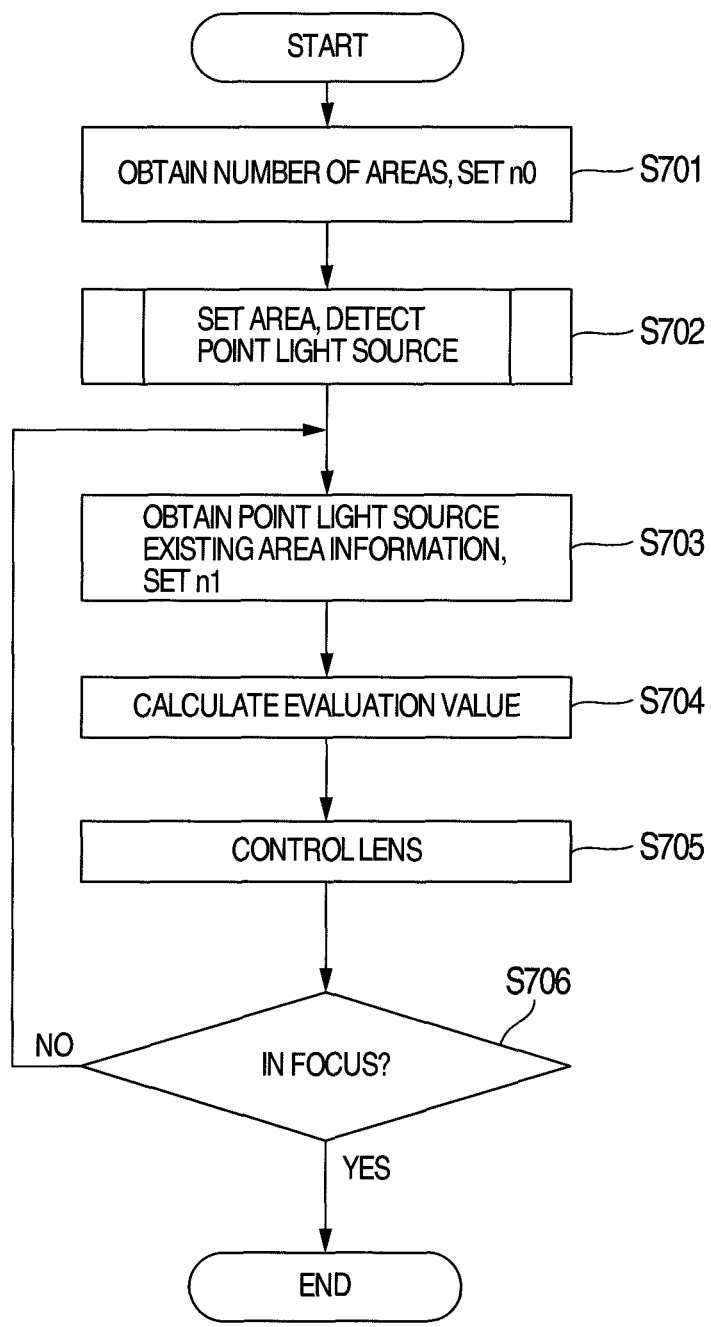
FIG. 7 is a flowchart showing an example of a processing flow of AF control coping with a point light source by use of areas set in the form of tiles in a screen.

FIG. 7 shows in a flowchart an example of a processing flow of AF control coping with a point light source by use of areas set in the form of tiles in a screen described in conjunction with FIGS. 4 to 6. The processing shown in FIG. 7 is executed by the system controller 107. In this method, areas each having a desired size are arranged in the form of tiles in a screen, and presence or absence of a point light source is judged for each area, to remove any area including a point light source from the target area for the calculation of the focus evaluation value. When the AF control operation is started, the system controller 107 obtains the number of areas to be set in the screen in step S701. The number of areas may be determined by use of the number of areas in the vertical direction and that in the horizontal direction, which are beforehand stored in, for example, an EEPROM (external device 106). Or, a constant may be used for the number of areas. The total number of areas to be set in the screen is saved as n0. In step S702, the system controller 107 instructs the area setting section 102 to set areas in the screen, for example, as shown in FIG. 4, and instructs the point light source detecting section 103 to detect presence or absence of a point light source in each of the areas thus set. The processing in step S702 will be described later in detail. In step S703, the system controller 107 obtains information regarding areas each of which includes a point light source from the point light source detecting section 103, and saves the number of areas as n1. In step S704, the system controller 107 sets the information of areas each including a point light source obtained in step S703 to the focus evaluation value calculating section 104 and then instructs the calculating section 104 to calculate the focus evaluation value by removing the areas each including a point light source from the target area for the calculation of the focus evaluation value. In step S705, the system controller 107 controls the focus lens to move a fixed quantity of length by use of the focus evaluation value calculated in step S704. In step S706, the system controller 107 judges whether or not the focus lens is at the in-focus point. If the focus lens is at the in-focus point, the system controller 107 terminates the processing. Otherwise, the system controller 107 returns to step S703 to execute the sequence of processing steps. According to the present embodiment, the operation to detect a point light source in each area is conducted only once in step S702. Hence, the number of areas as the target area for the calculation of the focus evaluation value is kept unchanged until the in-focus state is established. Therefore, once the control operation of the focus lens is started, it is possible to obtain a stable focus evaluation value with high precision as shown in FIG. 2 until the focus lens stops at the in-focus point. Through the processing above, the autofocus operation can be carried out with high precision also for a scene including a point light source.

Figure 8:
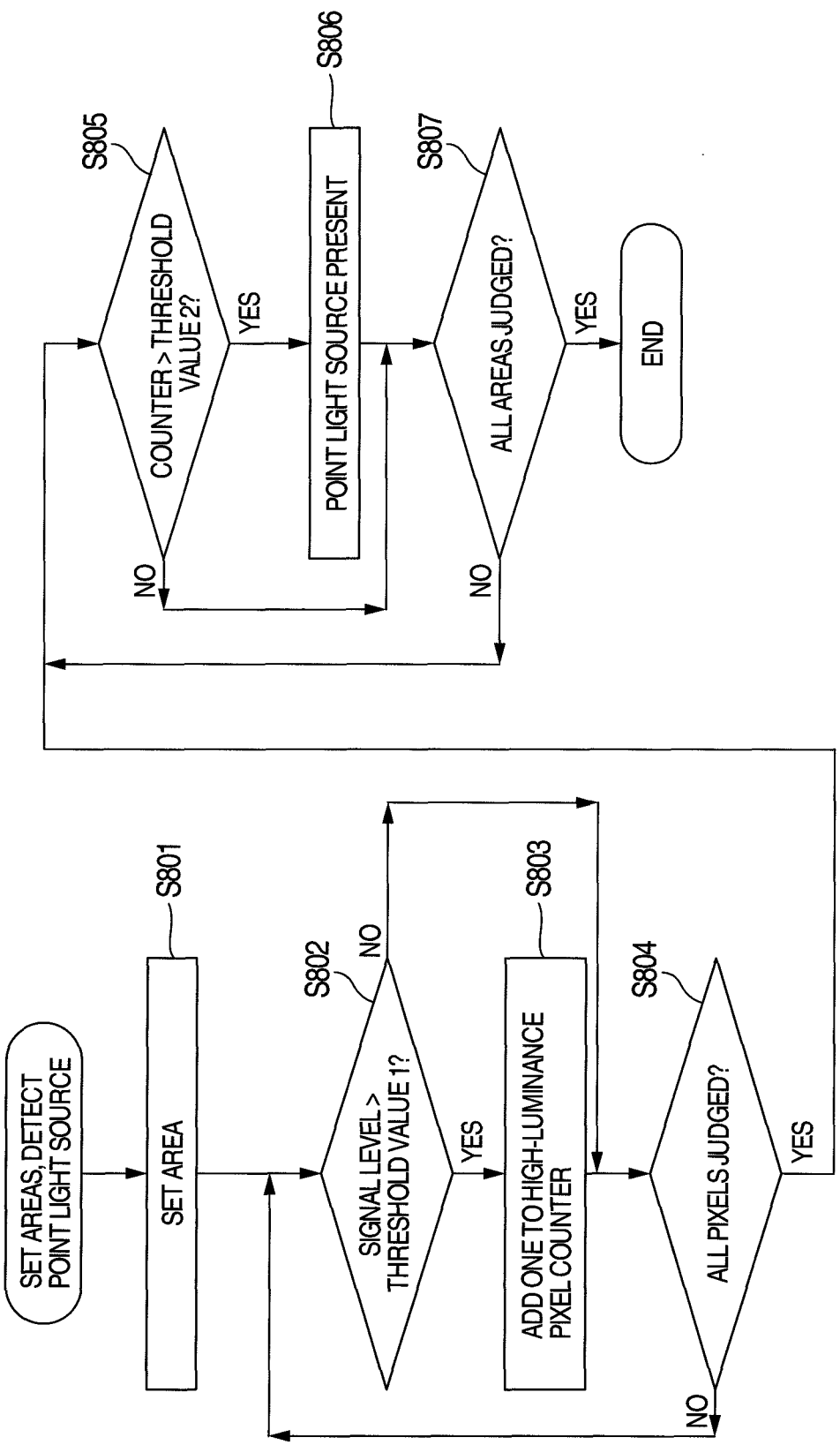
FIG. 8 is a flowchart showing an example of a detailed flow of area setting and point light source detection processing.

FIG. 8 shows in detail an example of the flow of processing in step S702 of FIG. 7 to set areas by the area setting section 102 and to detect a point light source by the point light source detecting section 103. In step S801, by using information set in the screen by the system controller 107, the area setting section 102 sets areas in the screen, for example, as shown in FIG. 4. In step S802, for each pixel, the point light source detecting section 103 compares a signal level corresponding to luminance with threshold value 1. If the value of the signal level is more than threshold value 1, it is judged that the pixel is part of a point light source. Hence, in step S803, the detecting section 103 increments the value of the high-luminance pixel counter by adding one thereto. For the operation, the high-luminance pixel counter is beforehand prepared, for example, for each area set in step S801 such that one is added to the value of the high-luminance pixel counter for the associated area. If the value of the signal level is less than threshold value 1 in step S802, control goes to step S804. In step S804, a check is made to determine whether or not the point light source detecting section 103 has conducted the judgment in step S802 for all pixels of the area set in step S801. If there remains any pixel to be judged, control returns to step S802 to execute the sequence of processing steps. If all pixels have been judged, control goes to step S805. In step S805, the point light source detecting section 103 compares the value of the high-luminance pixel counter of each area with threshold value 2. If the value of the counter is more than threshold value 2, control goes to step S806. In step S806, the point light source detecting section 103 judges that a point light source exists in the pertinent area. If the value of the counter is less than threshold value 2, control goes to step S807. In step S807, a check is made to determine whether or not the point light source detecting section 103 has conducted the judgment of step S805 for all areas. If there remains any area to be judged, control returns to step S805 to execute the sequence of processing steps. If all areas have been judged, the system terminates the processing. Incidentally, for threshold values 1 and 2, desired values may be beforehand stored in, for example, an EEPROM (external device 106) to be used in the processing. In the judgment in step S802, in place of the operation in which a signal level is compared with threshold value 1 only for the pertinent pixel, it is also possible to conduct an operation to compare a value obtained by calculating a weighted mean using adjacent pixels with threshold value 1. In the present embodiment, it is assumed that the processing shown in FIG. 8 is executed by hardware. However, naturally, the processing may be executed by software. This advantageously mitigates the influence of random noise. Through the processing above, it is possible, by judging presence or absence of a point light source for each of the areas, to identify areas each including a point light source.

Figure 9:
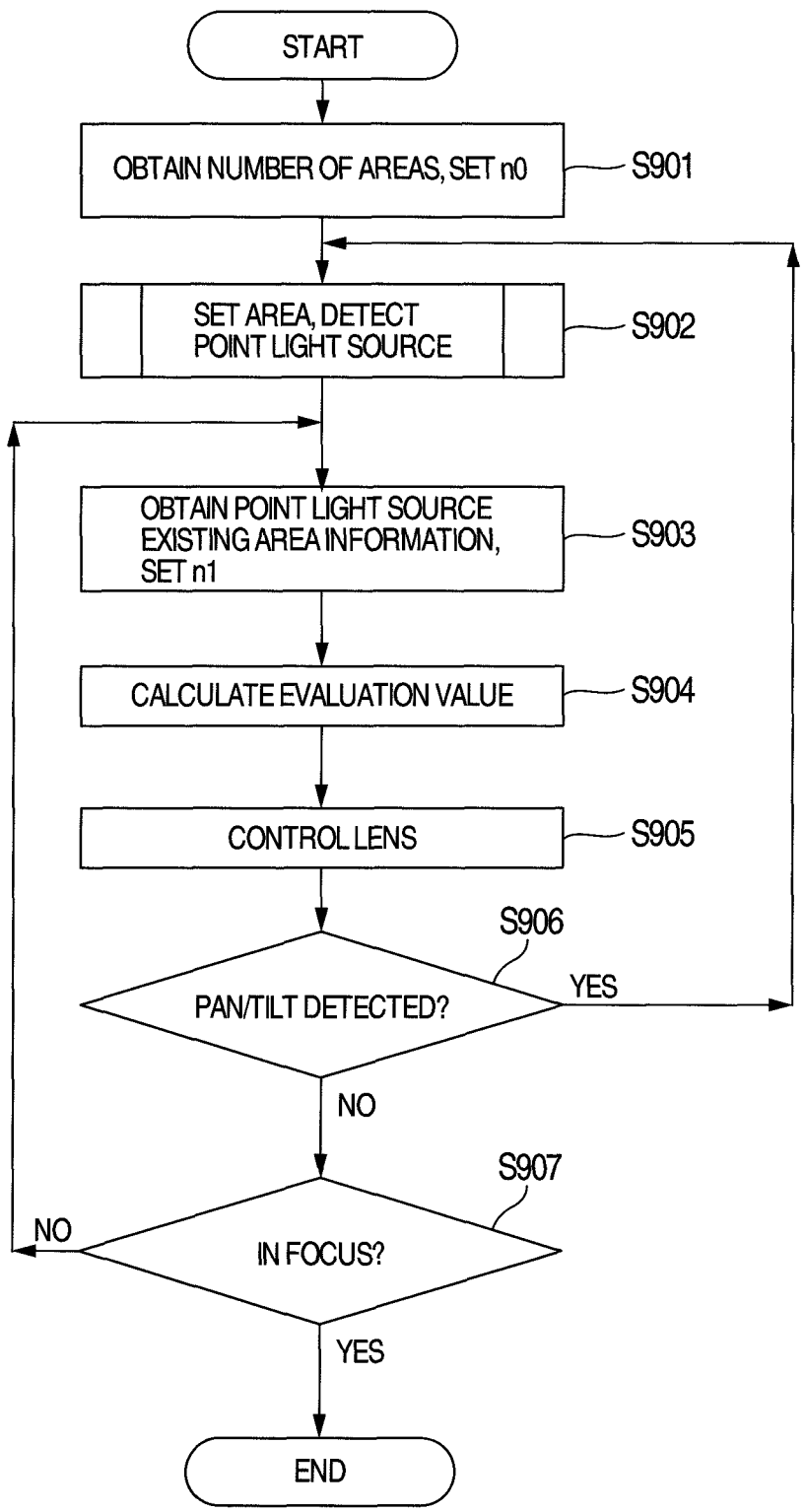
FIG. 9 is a flowchart showing an example a processing flow at occurrence of a change in a subject through a pan/tilt/zoom operation in AF control coping with a point light source.

FIG. 9 shows an example of the processing flow at occurrence of a change in a subject through a pan/tilt/zoom operation in AF control coping with a point light source. The processing of FIG. 9 is executed by the system controller 107. Since the steps other than step S906 are substantially equal to those shown in FIG. 7, description thereof will be given according to necessity. In step S906, "yes" results if a change occurs in the subject by a panning, tilting, or zooming operation. Control then returns to step S902 to execute the sequence of processing steps. If "no" results in step S906, control proceeds to step S907. The processing of FIG. 9 differs from that of FIG. 7 in that if the panning, tilting, or zooming operation is detected from when the control operation of the focus lens is started to when the focus lens stops at the in-focus point, the system conducts the operation to detect a point light source for the following reason. Since the position of the point light source changes due to the panning, tilting, or zooming operation of the camera, it is required to adjust AF control according to the change. The panning, tilting, or zooming operation is detected, for example, if the change in the focus evaluation value is equal to or more than a predetermined value. Or, a gyro-sensor (external device 106) may be employed. Further, it is also possible that a histogram calculating section is arranged in the autofocus section 108 of FIG. 1 to detect the panning, tilting, or zooming operation by use of a change in the histogram obtained by the histogram calculating section. As a result, when the position of a point light source is changed due to movement of the camera, an optimal focus evaluation value can be immediately calculated. This makes it possible to carry out the AF control operation with high precision. Due to the processing, even during the AF control operation of the focus lens, when the position and/or the size of the point light source are/is changed, it is possible to immediately update information regarding detection of a point light source, to thereby implement the AF control operation with high precision by appropriately and rapidly coping with the change in the subject.

Figure 10:
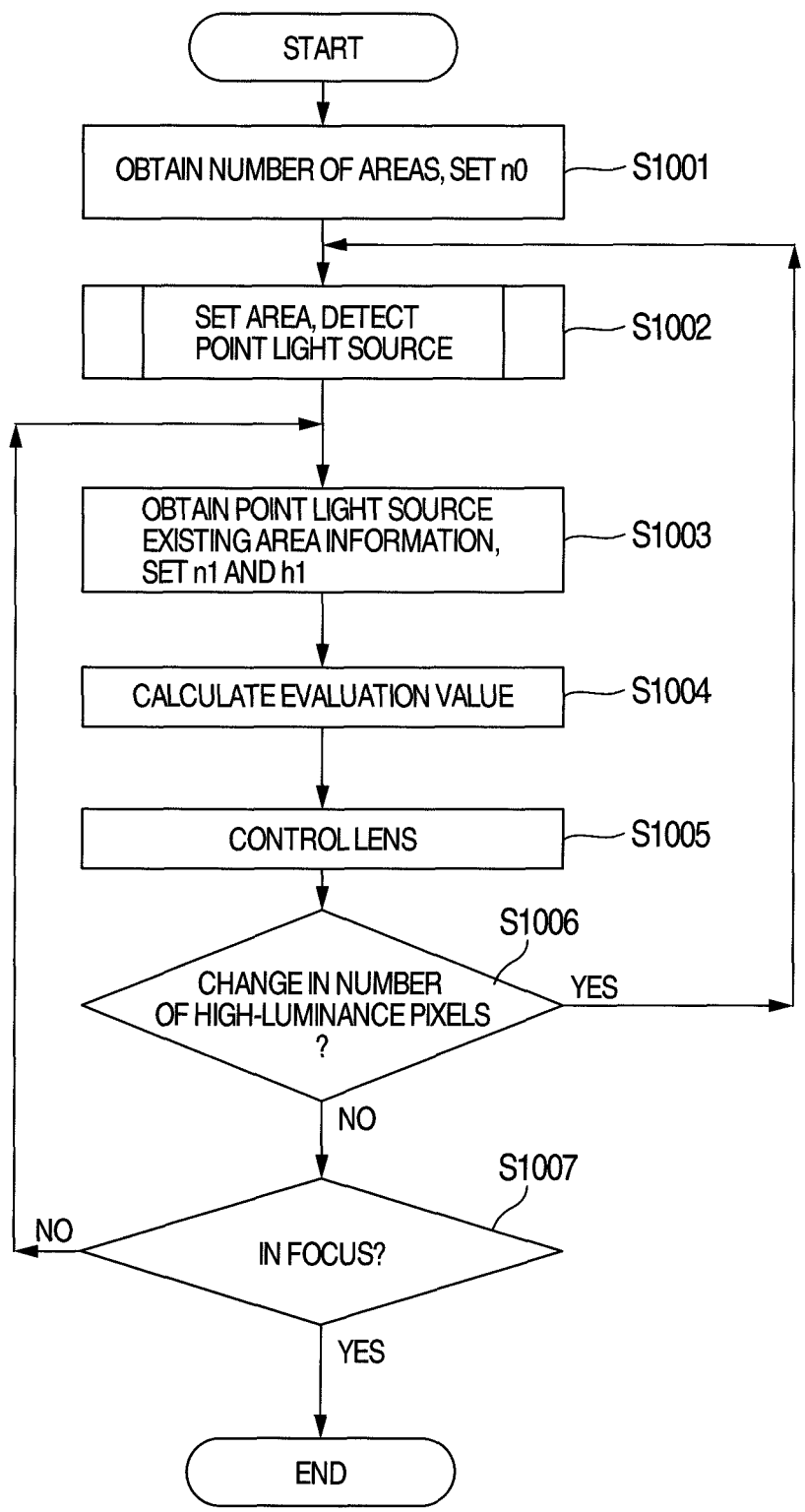
FIG. 10 is a flowchart showing an example of a processing flow when the number of high-luminance pixels largely changes in AF control coping with a point light source.

FIG. 10 shows an example of the processing flow when the number of high-luminance pixels largely changes in AF control coping with a point light source. The processing of FIG. 10 is executed by the system controller 107. In this processing, the point light source detecting section 103 calculates an accumulation value of high-luminance pixels in the areas. For 8-bit data, the high-luminance pixel is a pixel having a signal level of, for example, 230. Since the steps other than steps S1003 and S1006 are substantially equal to those shown in FIG. 7, description thereof will be given according to necessity. In step S1003, the system controller 107 obtains information regarding areas each including a point light source from the point light source detecting section 103. The number of areas each including a point light source (n1) and the number of high-luminance pixels (h1) are set in the processing. In step S1006, "yes" results if the number of high-luminance pixels largely lowers, for example, when the point light source turns off. Control then returns to step S1002 to execute the sequence of processing steps. Whether or not the number of high-luminance pixels largely varies may be judged by using the difference between the previous number of high-luminance pixels previously obtained with the latest number of high-luminance pixels latest obtained. That is, if the difference is more than a threshold value, step S1006 results in "yes". Additionally, it is also possible to compare the latest number of high-luminance pixels with a threshold value (dark) and a threshold value (bright). If the latest number is less than the threshold value (dark) or more than the threshold value (bright), step S1006 results in "yes". If step S1006 results in "no", control goes to step S1007. The difference between the processing of FIG. 10 and that of FIG. 7 resides in that the system conducts the operation to detect a point light source if the number of high-luminance pixels remarkably varies from when the control operation of the focus lens is started to when the focus lens stops at the in-focus point. As a result, for example, when the light source turns off and the influence from the point light source is removed or when the light source turns on and influence from a point light source appears, an optimal focus evaluation value can be immediately calculated. Hence, the AF control operation can be carried out with high precision. Due to the processing, even during the AF control operation of the focus lens, when the state of operation (on or off) of the point light source or the like is changed, it is possible to immediately update information regarding detection of a point light source, to thereby implement the AF control operation with high precision by appropriately and rapidly coping with the change in the subject.

(2) AF Control Using Weight Factors

Description will now be given of a method in which a desired number of tile-shaped areas are horizontally and vertically set in a screen such that a focus evaluation value of each area not including a point light source is multiplied by a weight factor corresponding to the position of the area. It is hence possible to easily establish an in-focus state of a subject in an area to which a larger value is set as the weight factor, to stably calculate focus evaluation values as shown in FIG. 2

Figure 11:
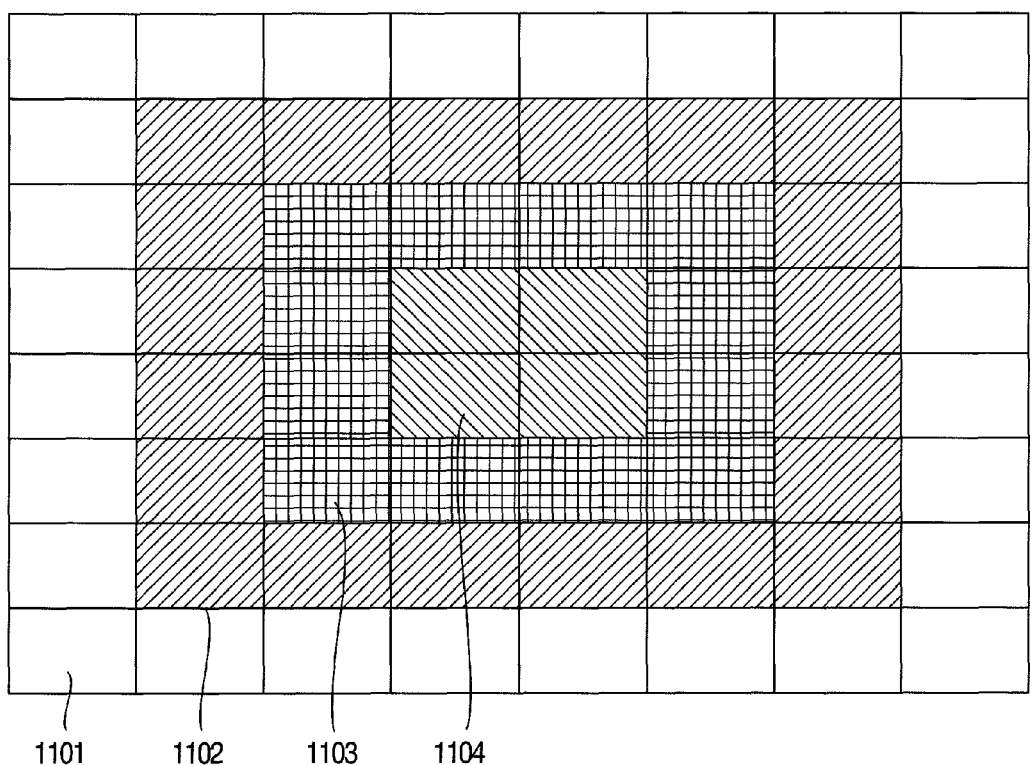
FIG. 11 is a diagram to explain an example of a method using weight factors corresponding to positions of areas when calculating focus evaluation values.

FIG. 11 shows an example of a method of calculating focus evaluation values by use of weight factors corresponding to positions of areas. Assume that the weight factor takes, for example, a larger value for areas in the frames set in the screen, the areas being less apart from the center of the frames. Specifically, the weight factor is one for the areas included in the frame 1101, two for the areas of the frame 1102, three for the areas included in the frame 1103, and four for the areas of the frame 1104.

Figure 12:
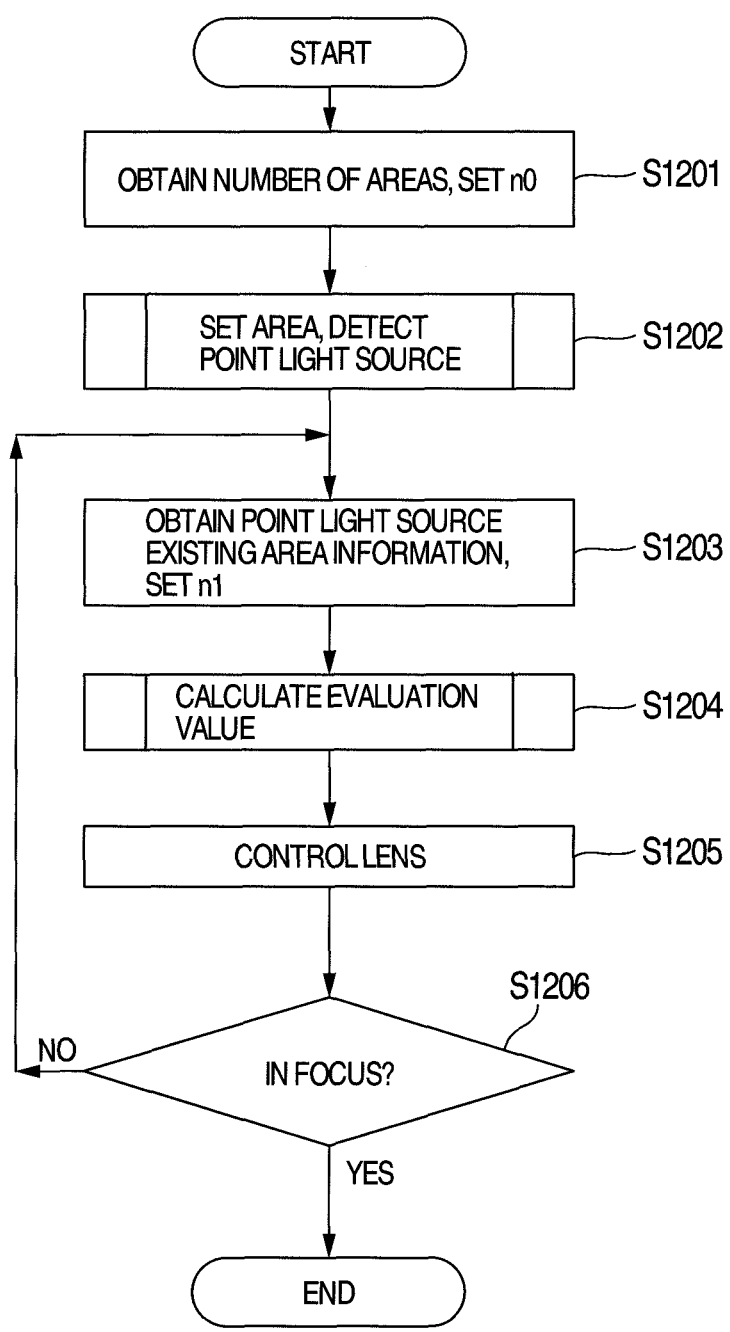
FIG. 12 is a flowchart showing an overall processing flow of AF control using weight factors.
Figure 13:
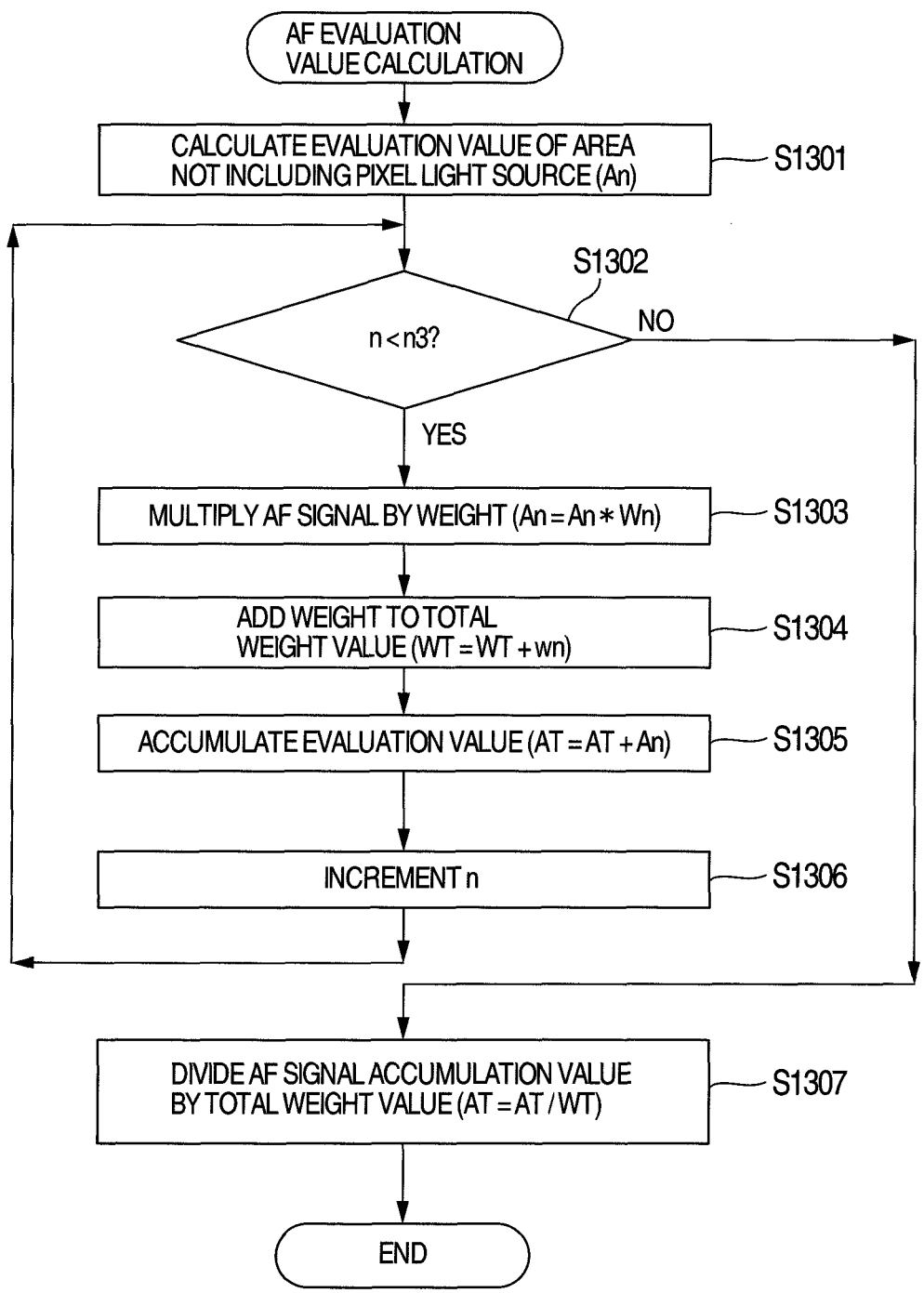
FIG. 13 is a flowchart showing in detail a processing flow of calculating focus evaluation values using weight factors.

FIGS. 12 and 13 show examples of processing flows to calculate focus evaluation values using weight factors shown in FIG. 11. FIG. 12 is a flowchart showing an overall processing flow of AF control using weight factors. The processing of FIG. 12 is executed by the system controller 107. Assume that the system controller 107 sets the weight factor of each area to the area setting section 102 before conducting step S1202. Excepting the setting of the weight factor of each area and step S1204, the processing of FIG. 12 is substantially equal to that of FIG. 7. Hence, description will be given of the processing of FIG. 12 according to necessity. Description will now be given of the processing of step S1204 by referring to FIG. 13. FIG. 13 is a flowchart showing in detail the processing of step S1204 of FIG. 12 in which the focus evaluation value calculating section 104 calculates focus evaluation values by use of weight factors. Assume that the area counter is set to n, the n-th area among the areas not including a point light source has a focus evaluation value of An and a weight factor of Wn, the total of weight factors is WT, and the accumulation value of the focus evaluation values of respective areas is AT. The values of n, WT, and AT are initialized to zero before step S1301. In step S1301, the focus evaluation value calculating section 104 calculates a focus evaluation value (An) for each of the areas not including a point light source. In step S1302, the calculating section 104 determines the number of areas n3 (n3=n0-n1) not including a point light source by use of the area setting number n0 and the number of areas n1 including a point light source, n0 and n1 being obtained through the processing shown in FIG. 12. The focus evaluation value calculating section 104 then compares n3 with n of the area counter. If n is smaller, control goes to step S1303. If n is larger, control goes to step S1307. In step S1303, the calculating section 104 multiplies the focus evaluation value An of the n-th area by the associated weight factor (An=An*Wn). In step S1304, the calculating section 104 adds the weight factor of the n-th area to the weight factor total value (WT=T+Wn). In step S1305, the calculating section 104 accumulates the focus evaluation value by adding the focus evaluation value of the n-th area (AT=AT+An). In step S1306, the calculating section 104 increments the counter value by one and then returns again to step S1302. In step S1307, the focus evaluation value calculating section 104 divides the total of focus evaluation values AT by the total of weight factor values (AT=AT/WT), sets the quotient as the final focus evaluation value, and then terminates the processing. In the present embodiment, it is assumed that the processing of FIG. 13 is executed by hardware. However, naturally, the processing may also be executed by software. Due to the processing, the final focus evaluation value is calculated by applying, to the focus evaluation value of each area not including a point light source, a weight factor corresponding to the position of the area. Hence, the focus lens is easily moved to the in-focus point of the subject, and it is possible to obtain a stable focus evaluation value as shown in FIG. 2. As a result, the autofocus control operation can be achieved with high precision also for a scene including a point light source. Incidentally, the weight factor of each area is not limited to the value shown in FIG. 11. For example, when conducting the autofocus control operation by attaching importance to a subject existing at a place outside the central section of the screen, it is also possible that the weight factor of an arbitrary area including the subject takes the largest value and the values of the other areas are set according to the distance relative to the area of the subject. If the weight factor takes one and the same value for all areas, there is obtained a focus evaluation value substantially equivalent to that obtained through the processing shown in FIG. 7.

(3) Point Light Source Area Subtraction Method

Description will now be given of a method in which a large area is set in a screen such that in a part of the large area including a point light source, a small area is set to entirely cover the point light source, and the accumulation value of the focus evaluation value of the small area is subtracted from the focus evaluation value of the large area, to thereby calculate the final focus evaluation value. In the present embodiment, this is referred to as a point light source area subtraction method.

Figure 14:
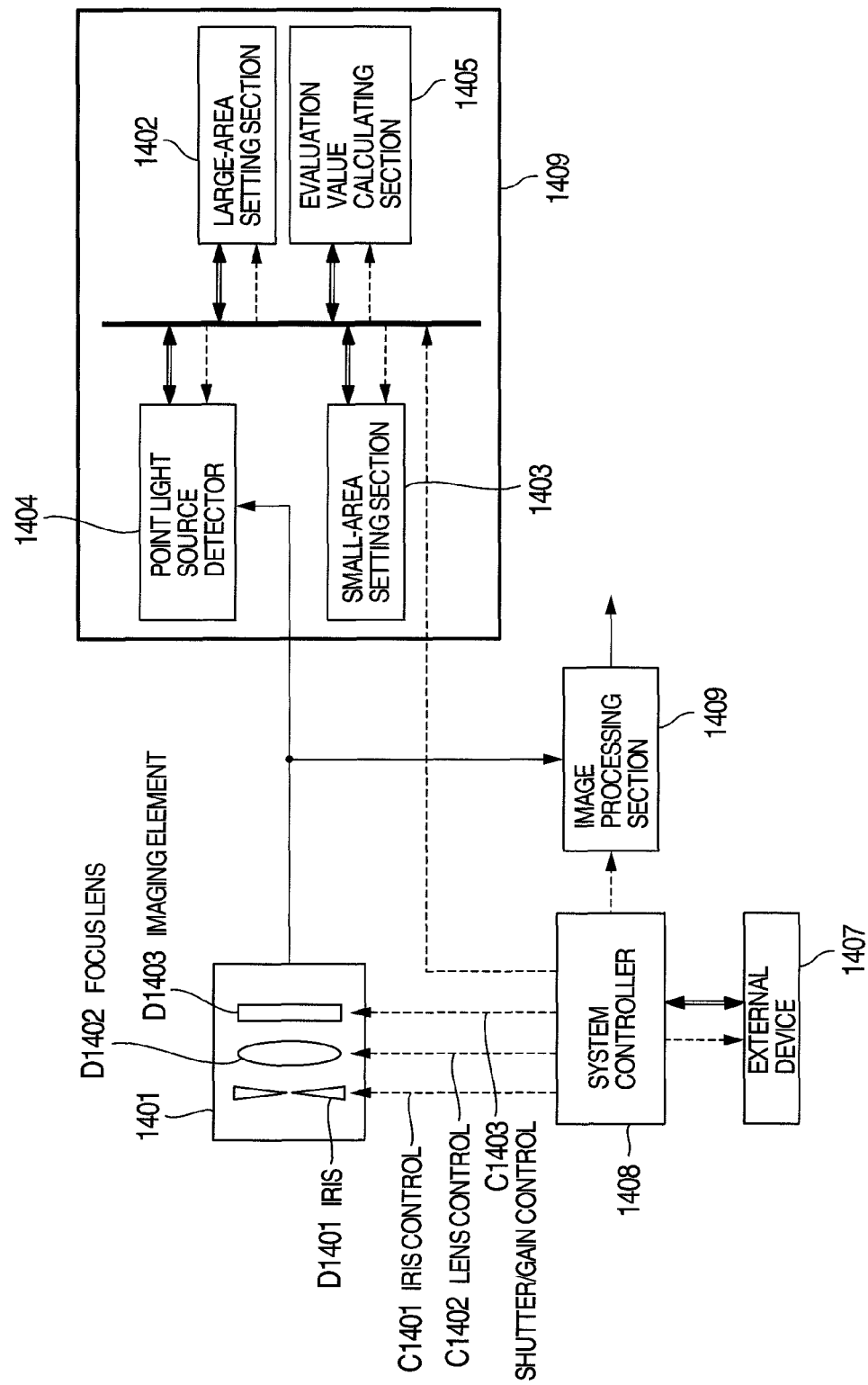
FIG. 14 is a diagram showing a second basic configuration example of an image signal processing device according to an embodiment.

Description will be given in detail of the point light source area subtraction method. FIG. 14 shows a second basic configuration example of the image signal processing device according to the present embodiment. The same constituent components of FIG. 14 and FIG. 1 are substantially equal in structure to each other. Hence, description thereof will be described according to necessity. An imaging section 1401 appropriately includes an iris D1401, a focus lens D1402, and an imaging element D1403 and has a function similar to the imaging section 101 of FIG. 1. For these constituent components, a system controller 1408 carries out iris control C1401, lens control C 1402, and shutter/gain control C 1403. To prevent the rear focus in which the in-focus point of the focus lens is set to the background of the subject, not to the subject itself, a large-area setting section 1402 sets, in response to an instruction from the system controller 1408, an area smaller than the screen and larger than an area set by a small-area setting section 1403. In response to an instruction from the system controller 1408, the small-area setting section 1403 sets a desired number of small areas with a desired size at a desired position. In response to an instruction from the system controller 1408, a point light source detecting section 1404 compares image signals of the large area set by the large-area setting section 1402 and selected from the image signals obtained from the imaging section 101 with a threshold value to judge and to detect presence or absence of a point light source in the large area. As a result, the detecting section 1404 obtains information regarding the position and the size of each point light source thus detected. A focus evaluation value calculating section 1405 calculates, in response to an instruction from the system controller 1408, a focus evaluation value by using image signals of an area designated by the system controller 1408. The focus evaluation value is an accumulation value obtained, for example, as below. For each line of image signals, the image signals of the designated area are passed through a Band-Path Filter (BPF) to obtain a value. The values thus resultantly obtained for the respective lines are added to each other to thereby calculate the focus evaluation value. In response to an instruction from the system controller 1408, an image processing section 1406 conducts image signal processing for image signals such as removal of noise, gamma correction, contour emphasis, filtering, zooming, hand movement correction, and image recognition as well as output interface processing to convert the image signal into a signal of a signal format conforming to an output device, e.g., a TV set or a storage. The output interface processing is, for example, a conversion of image signals into video output signals conforming to NTSC and PAL signals; specifically a conversion of image signals into HDMI signals as well as into predetermined signals for transmission thereof via a network. An external device 1407 includes external devices, for example, an EEPROM to save various setting states, various sensors, and a flash memory and is controlled by the system controller 1408. The system controller 1408 controls the imaging section 1401, the large-area setting section 1402, the small-area setting section 1403, the point light source detecting section 1404, the focus evaluation value calculating section 1405, the image processing section 1406, and the external device 1407. An autofocus section 1409 indicates a group of functional blocks required for autofocus control. In this configuration, the point light source detecting section 1404 calculates the position and the size of a point light source in the large area set by the large-area setting section 1402. By using results of the calculation, the system controller 1408 instructs the small-area setting section 1403 to set a small area to cover the point light source. The focus evaluation value calculating section 1405 calculates a focus evaluation value (large) based on image signals in the large area and a focus evaluation value (small) based on image signals in the small area. The system controller 1408 subtracts the focus evaluation value (small) from the focus evaluation value (large) to obtain the final focus evaluation value. The obtained focus evaluation value is substantially equivalent to that obtained based on the image signals in an area not including a point light source. Hence, it is possible to conduct the autofocus operation with high precision also for a scene including a point light source, the autofocus operation not being influenced by the point light source. According to the present method, the focus evaluation value is calculated by hardware for the area designated by the system controller 1408 (FIG. 14), and the processing to calculate the focus evaluation value coping with a point light source is executed by software under control of the system controller 1408. It is hence possible to carry out a flexible control operation by software.

Figure 15:
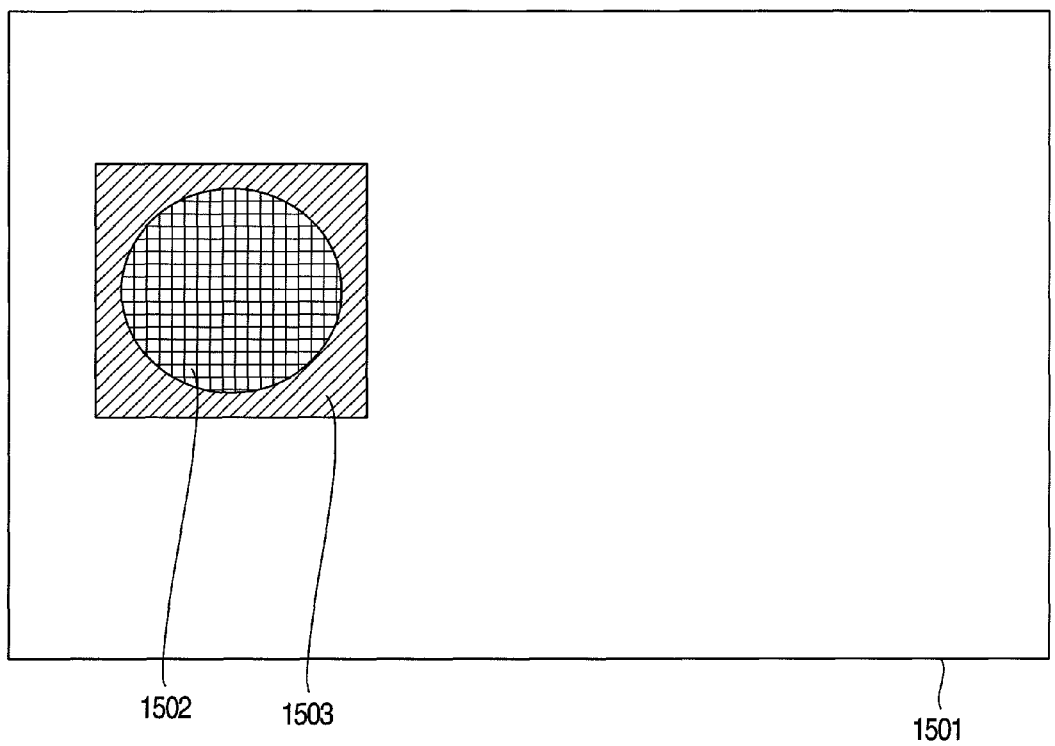
FIG. 15 is a diagram showing an example of a method of setting a small area when a point light source is present in a large area.
Figure 16:
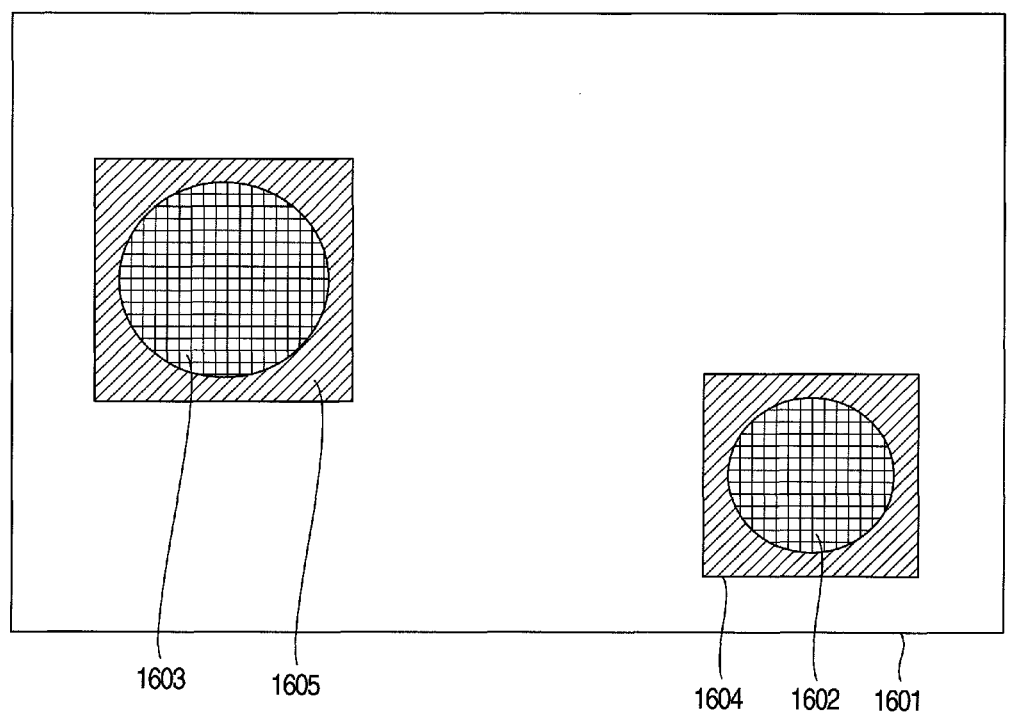
FIG. 16 is a diagram showing an example of a method of setting small areas when a plurality of point light sources are present in an AF frame.

FIG. 15 shows an example of a method of setting a small area when a point light source is present in a large area. Numeral 1501 indicates a large area and numeral 1502 indicates a point light source in the large area. Numeral 1503 is a small area set at a position and with a size to cover the point light source in the large area. FIG. 16 shows an example of a method of setting small areas when a plurality of point light sources are present in a large area. Numeral 1601 indicates a large area and numerals 1602 and 1603 represent point light sources in the large area 1601. Numerals 1604 and 1605 indicate small areas each being set at a position and with a size to cover the associated point light source.

Figure 17:
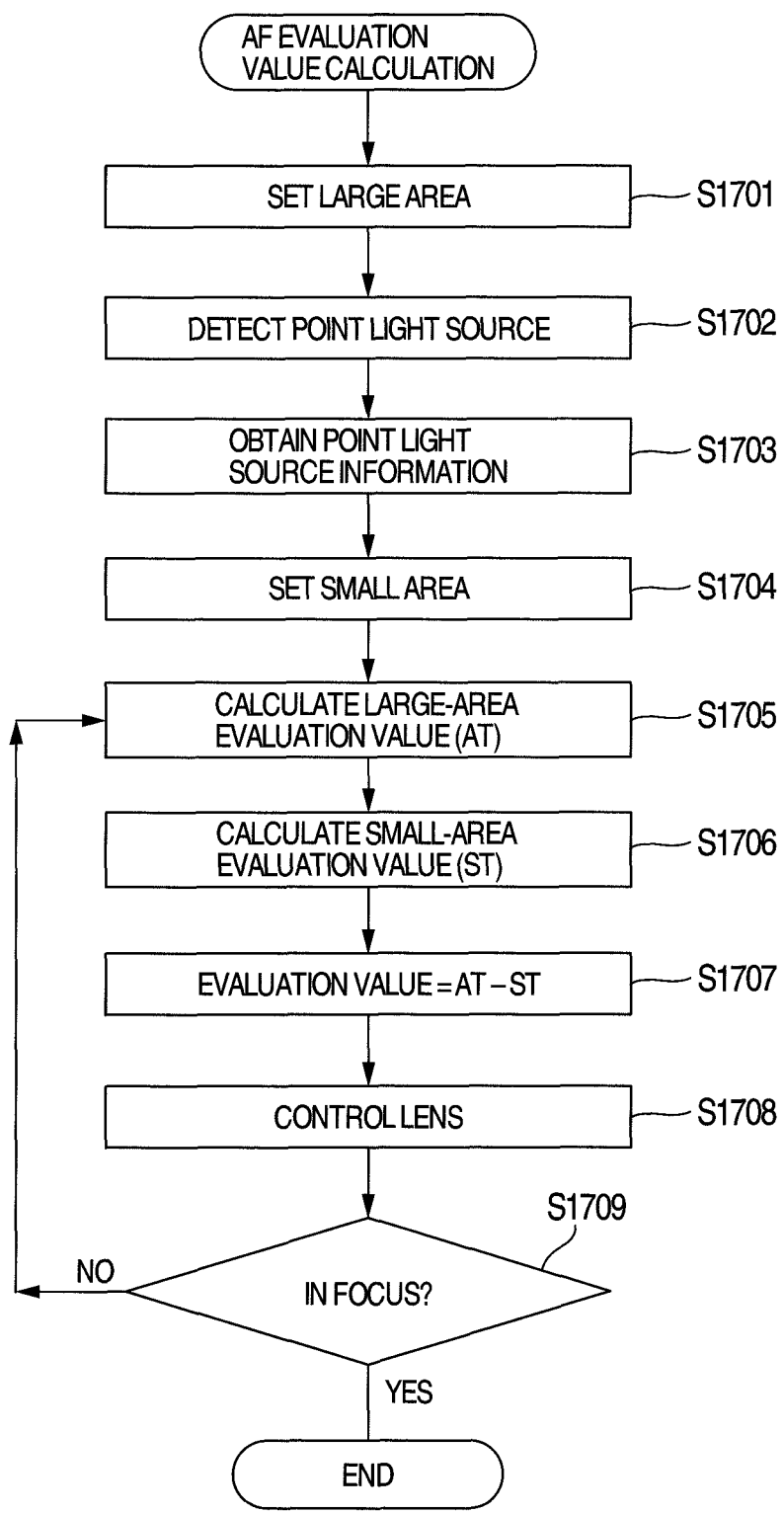
FIG. 17 is a flowchart to explain an example of autofocus control coping with a point light source in which a small area is set according to the position and the size of a point light source.

FIG. 17 shows in a flowchart an example of an autofocus control operation coping with a point light source in which a small area is set according to the position and the size of a point light source. The processing of FIG. 17 is executed by the system controller 1408. In step S1701, the system controller 1408 designates the position and the size of a large area and then the large-area setting section 1402 sets the large area. In step S1702, the point light source detecting section 1404 detects a point light source in the large area set in step S1701. In step S1703, the system controller 1408 obtains information regarding the position and the size of the point light source from the point light source detecting section 1404. In step S1704, by use of the information obtained in step S1703, the system controller 1408 instructs the small-area setting section 1403 to set a small area to cover the point light source. In step S1705, the focus evaluation value calculating section 1405 calculates the focus evaluation value (AT) based on the image signals in the area set by the large-area setting section 1402. In step S1706, the calculating section 1405 calculates the focus evaluation value (ST) based on the image signals in the area set by the small-area setting section 1403. When there exist a plurality of small areas, an accumulation value of the focus evaluation values of the respective small areas is set as the focus evaluation value (ST). In step S1707, the system controller 1408 subtracts the small-area focus evaluation value (ST) from the large-area focus evaluation value (AT) to obtain the final focus evaluation value. In step S1708, the focus lens is controlled for a preset quantity of length by using the focus evaluation value calculated in step S1707. In step S1709, whether or not the focus lens is at the in-focus point is judged. If the focus lens is at the in-focus point, the processing is terminated. Otherwise, control returns to step S1705 to conduct the sequence of processing steps. Through the processing above, it is possible, by subtracting the small-area focus evaluation value from the large-area focus evaluation value, to obtain the final focus evaluation value substantially equivalent to that obtained based on the image signals in an area not including a point light source. Hence, it is possible to conduct the autofocus control operation with high precision also for a scene including a point light source, the autofocus control operation not being influenced by the point light source.

The present invention is not restricted by the embodiment, but includes various variations thereof. For example, description has been given in detail of the embodiment for easy understanding thereof, but the present invention is not limited to an image signal processing device including all of the constituent components described above. It is also possible to replace part of a first embodiment of the present invention with part of a second embodiment thereof. Or, a configuration of the first embodiment may be added to a configuration of the second embodiment. For part of a configuration of each of the embodiments, it is possible to conduct addition, deletion, and replacement of another configuration.

In each configuration described above, part of or all of the constituent components may be implemented by hardware or by programs to be executed by a processor. Further, control lines and information lines are shown only when they are required for the explanation of the present invention. Hence, there are not shown all of the control and information lines required for products according to the present invention. It can be considered that almost all constituent components are connected to each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image signal processing device, comprising:
an imaging means including a focus lens;
a point light source detection means for detecting a point light source in a target area used to calculate a focus evaluation value, the focus evaluation value to be used to move the focus lens to an in-focus point;
an evaluation value calculation means for identifying a point light area, within the target area, having the point light source detected by the point light source detection means, and for calculating a focus evaluation value for each position of the focus lens, for a remainder area obtained by removing the point light area from the target area; and
a system control means for controlling the focus lens based on the focus evaluation value calculated by the evaluation value calculation means, and for controlling an operation during a time period starting when autofocus control is started and ending when the focus lens is set to an in-focus state;
wherein during a time period in which the evaluation value calculation means calculates the focus evaluation value for each position of the focus lens, the system control means conducts a control operation to keep the point light area unchanged.

2. The image signal processing device according to claim 1, further comprising:
an area setting means for dividing the target area, in order to calculate a focus evaluation value for each of a plurality of areas, and for setting the areas;
wherein the evaluation value calculation means sets the point light area in an area determined by the area setting means.

3. The image signal processing device according to claim 2,
wherein the evaluation value calculation means calculates the focus evaluation value by determining a weight factor for each of the areas set by the area setting means.

4. The image signal processing device according to claim 2,
wherein the areas set by the area setting means have arbitrary sizes, and form a tiled wall with an arbitrary number of areas in each of the vertical and horizontal directions.

5. The image signal processing device according to claim 1, further comprising:
an arbitrary area setting means for setting the target area in order to calculate a focus evaluation value, with an arbitrary size and at an arbitrary position.

6. The image signal processing device according to claim 5, further comprising:
a small-area setting means for setting an arbitrary number of small areas, each with an arbitrary size and at an arbitrary position in the area set by the arbitrary area setting means,
wherein the system control means controls the position and the size of each of the small areas set by the arbitrary area setting means, based on information detected by the point light source detection means regarding the point light area.

7. The image signal processing device according to claim 6,
wherein the focus evaluation value used to control the focus lens is obtained by subtracting
the focus evaluation value calculated based on image signals in the small area set by the small-area setting means from
the focus evaluation value calculated based on image signals in the area set by the arbitrary area setting means.

8. The image signal processing device according to claim 5,
wherein the arbitrary area setting means is also for setting an arbitrary number of areas.

9. The image signal processing device according to claim 1, further comprising:
a pan/tilt detection means for detecting any of a panning operation and a tilting operation,
wherein whenever the pan/tilt detection means detects any of a panning operation and a tilting operation, the point light source detection means conducts an additional operation to detect a point light source, even during a period of time during a time period starting when autofocus control is started and ending when the focus lens is set to an in-focus state.

10. The image signal processing device according to claim 1,
wherein whenever a change in the number of high-luminance pixel is equal to or more than a predetermined value, the point light source detection means conducts an additional operation to detect a point light source, even during a period of time during a time period starting when autofocus control is started and ending when the focus lens is set to an in-focus state.

11. An image signal processing device, comprising:
an imaging unit including a focus lens;
a point light source detector configured to detect a point light source in a target area used to calculate a focus evaluation value, the focus evaluation value to be used to move the focus lens to an in-focus point;
an evaluation value calculator configured to identify a point light area, within the target area, having the point light source detected by the point light source detector, and to calculate a focus evaluation value for each position of the focus lens, for an area obtained by removing the point light area from the target area; and
a system controller configured to control the focus lens based on the focus evaluation value calculated by the evaluation value calculator, and to control an operation during a time period starting when autofocus control is started and ending when the focus lens is set to an in-focus state;
wherein during a time period in which the evaluation value calculator calculates the focus evaluation value for each position of the focus lens, the system controller is configured to conduct a control operation to keep the point light area unchanged.

12. The image signal processing device according to claim 11, further comprising:
an area setting unit configured to divide the target area, in order to calculate a focus evaluation value for each of a plurality of areas, and to set the areas;
wherein the evaluation value calculator is configured to set the point light area in an area determined by the area setting unit.

13. The image signal processing device according to claim 12,
wherein the evaluation value calculator is configured to calculate the focus evaluation value by determining a weight factor for each of the areas set by the area setting unit.

14. The image signal processing device according to claim 12,
wherein the areas set by the area setting unit have arbitrary sizes, and form a tiled wall with an arbitrary number of areas in each of the vertical and horizontal directions.

15. The image signal processing device according to claim 11, further comprising:
an arbitrary area setting unit configured to set the target area in order to calculate a focus evaluation value, with an arbitrary size and at an arbitrary position.

16. The image signal processing device according to claim 15, further comprising:
a small-area setting unit configured to set an arbitrary number of small areas, each with an arbitrary size and at an arbitrary position in the area set by the arbitrary area setting unit,
wherein the system controller is configured to control the position and the size of each of the small areas set by the arbitrary area setting unit, based on information detected by the point light source detector regarding the point light area.

17. The image signal processing device according to claim 16,
wherein the focus evaluation value used to control the focus lens is obtained by subtracting
the focus evaluation value calculated based on image signals in the small area set by the small-area setting unit from
the focus evaluation value calculated based on image signals in the area set by the arbitrary area setting unit.

18. The image signal processing device according to claim 15,
wherein the arbitrary area setting unit is configured to set an arbitrary number of areas.

19. The image signal processing device according to claim 11, further comprising:
a pan/tilt detector configured to detect any of a panning operation and a tilting operation,
wherein whenever the pan/tilt detector detects any of a panning operation and a tilting operation, the point light source detector conducts an additional operation to detect a point light source, even during a period of time during a time period starting when autofocus control is started and ending when the focus lens is set to an in-focus state.

20. The image signal processing device according to claim 11,
wherein whenever a change in the number of high-luminance pixel is equal to or more than a predetermined value, the point light source detector conducts an additional operation to detect a point light source, even during a period of time during a time period starting when autofocus control is started and ending when the focus lens is set to an in-focus state.

* * * * *